(12) United States Patent
Muramatsu et al.

(10) Patent No.: US 8,731,798 B2
(45) Date of Patent: May 20, 2014

(54) TEMPERATURE ESTIMATION APPARATUS FOR AEROPLANE GAS TURBINE ENGINE

(75) Inventors: Hironori Muramatsu, Wako (JP); Tomohisa Saita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 330 days.

(21) Appl. No.: 13/233,103

(22) Filed: Sep. 15, 2011

(65) Prior Publication Data

US 2012/0072091 A1 Mar. 22, 2012

(30) Foreign Application Priority Data

Sep. 16, 2010 (JP) ................................ 2010-208314

(51) Int. Cl.
*G01K 7/00* (2006.01)
(52) U.S. Cl.
USPC ................... 701/100; 701/1; 701/99; 60/772; 60/776; 60/778
(58) Field of Classification Search
USPC .............. 701/3, 100, 130, 1, 99; 60/772, 776, 60/778
See application file for complete search history.

(56) References Cited

U.S. PATENT DOCUMENTS

| | | | | |
|---|---|---|---|---|
| 6,393,355 | B1 * | 5/2002 | Muramatsu | 701/100 |
| 7,216,489 | B2 * | 5/2007 | Uluyol et al. | 60/778 |
| 7,369,932 | B2 * | 5/2008 | Kim et al. | 701/100 |
| 7,506,517 | B2 * | 3/2009 | Uluyol et al. | 60/786 |
| 2004/0176879 | A1 * | 9/2004 | Menon et al. | 701/1 |
| 2005/0021212 | A1 * | 1/2005 | Gayme et al. | 701/99 |
| 2005/0217273 | A1 * | 10/2005 | Muramatsu et al. | 60/773 |
| 2005/0217274 | A1 * | 10/2005 | Muramatsu et al. | 60/773 |
| 2005/0222747 | A1 * | 10/2005 | Vhora et al. | 701/100 |
| 2005/0267667 | A1 * | 12/2005 | Muramatsu et al. | 701/100 |
| 2006/0195248 | A1 * | 8/2006 | Kim et al. | 701/100 |
| 2007/0028625 | A1 * | 2/2007 | Joshi et al. | 60/777 |
| 2007/0088982 | A1 * | 4/2007 | Guralnik et al. | 714/26 |
| 2007/0214795 | A1 * | 9/2007 | Cooker et al. | 60/772 |
| 2007/0234734 | A1 * | 10/2007 | Uluyol et al. | 60/778 |
| 2007/0260390 | A1 * | 11/2007 | Kim et al. | 701/100 |
| 2011/0041510 | A1 * | 2/2011 | Sasaki et al. | 60/776 |
| 2011/0077895 | A1 * | 3/2011 | Muramatsu et al. | 702/130 |

FOREIGN PATENT DOCUMENTS

JP 2002-106364 4/2002

* cited by examiner

*Primary Examiner* — John R Olszewski
*Assistant Examiner* — Truc M Do
(74) *Attorney, Agent, or Firm* — Rankin, Hill & Clark LLP

(57) ABSTRACT

In a temperature estimation apparatus for an aeroplane gas turbine engine, there are provided with a calculator that calculates a low-pressure turbine outlet temperature change (dEGT) based on low-pressure turbine rotational speed (N1) and ambient temperature (T1), a calculator that calculates a model outlet temperature (MODEL-EGTC) based on corrected high-pressure turbine rotational speed (N2C) and atmospheric pressure (P0) to calculate a model outlet temperature difference (dEGTC) by subtracting the calculated temperature (MODEL-EGTC) from a corrected low-pressure turbine outlet temperature (EGTC), a calculator that calculates a correction amount (dEGTad) relative to the model outlet temperature difference (dEGTC) based on the model outlet temperature difference (dEGTC) and low-pressure turbine rotational speed (N1), and a calculator that calculates an estimation value of the low-pressure turbine inlet temperature (ITT) based on the low-pressure turbine outlet temperature (EGT), etc., thereby enabling to estimate the inlet temperature of the low-pressure turbine.

21 Claims, 2 Drawing Sheets

TEMPERATURE ESTIMATION APPARATUS FOR AEROPLANE GAS TURBINE ENGINE

BACKGROUND OF THE INVENTION

1. Field of the Invention

This invention relates to a temperature estimation apparatus for an aeroplane gas turbine engine.

2. Description of the Related Art

In an aeroplane gas turbine engine equipped with a high-pressure turbine to be rotated by high-pressure gas injected from a combustion chamber of the engine and with a low-pressure turbine located downstream of the high-pressure turbine to be rotated by low-pressure gas passed through the high-pressure turbine, temperature at an inlet of the low-pressure turbine is usually detected by a temperature sensor to prevent the engine from overheating.

However, installation of the temperature sensor at (or near) the inlet of the low-pressure turbine would disadvantageously restrict the freedom of design layout and in addition, the temperature sensor itself must have an excellent heat-resistance. It will accordingly be preferable to estimate the inlet temperature of the low-pressure turbine based on the other temperature so as to make the engine smaller and more compact.

To cope with it, it has been proposed to detect rotational speed and outlet temperature of the low-pressure turbine, to calculate a correction value from the detected rotational speed of the low-pressure turbine and to obtain an estimated inlet temperature of the high-pressure turbine by adding the correction value to the detected outlet temperature, as taught by, for example, Japanese Laid-Open Patent Application No. 2002-106364.

SUMMARY OF THE INVENTION

In the reference, the temperature is thus obtained, not by the measurement, but through the estimation. However, the temperature estimation was on the inlet temperature of the high-pressure turbine and was not that of the low-pressure turbine.

An object of this invention is therefore to provide a temperature estimation apparatus for an aeroplane gas turbine engine that estimates the inlet temperature of the low-pressure turbine.

In order to achieve the object, this invention provides in its first aspect an apparatus for estimating temperature for an aeroplane gas turbine engine mounted on an aircraft and having a combustion chamber, a high-pressure turbine rotated by high-pressure gas exhausted from the combustion chamber, and a low-pressure turbine located downstream of the high-pressure turbine to be rotated by low-pressure gas which has passed through the high-pressure turbine, comprising: a low-pressure turbine rotational speed sensor adapted to detect a rotational speed of the low-pressure turbine (N1); an ambient temperature sensor adapted to detect an ambient temperature of the engine (T1); an outlet temperature sensor adapted to detect an outlet temperature of the low-pressure turbine (EGT); a high-pressure turbine rotational speed sensor adapted to detect a rotational speed of the high-pressure turbine (N2); an atmospheric pressure sensor adapted to detect an atmospheric pressure (P0); an outlet temperature change calculator that calculates a low-pressure turbine outlet temperature change (dEGT) based on at least the detected low-pressure turbine rotational speed (N1) and the ambient temperature (T1); a model outlet temperature difference calculator that calculates a model outlet temperature (MODEL-EGTC) based on at least a corrected high-pressure turbine rotational speed (N2C) obtained by correcting the detected high-pressure turbine rotational speed (N2) by the detected ambient temperature (T1) and the detected atmospheric pressure (P0), and calculates a model outlet temperature difference (dEGTC) by subtracting the calculated model outlet temperature (MODEL-EGTC) from a corrected low-pressure turbine outlet temperature (EGTC) obtained by correcting the detected low-pressure turbine outlet temperature (EGT) by the detected ambient temperature (T1); a model outlet temperature difference correction amount calculator that calculates a correction amount (dEGTad) relative to the calculated model outlet temperature difference (dEGTC) based on the calculated model outlet temperature difference (dEGTC) and the detected low-pressure turbine rotational speed (N1); and an inlet temperature estimation value calculator that calculates an estimation value of the low-pressure turbine inlet temperature (ITT) based on at least the detected low-pressure turbine outlet temperature (EGT), the calculated outlet temperature change (dEGT) and the correction amount (dEGTad) relative to the calculated model outlet temperature difference (dEGTC).

In order to achieve the object, this invention provides in its second aspect an apparatus for estimating temperature for an aeroplane gas turbine engine mounted on an aircraft and having a combustion chamber, a high-pressure turbine rotated by high-pressure gas exhausted from the combustion chamber, and a low-pressure turbine located downstream of the high-pressure turbine to be rotated by low-pressure gas which has passed through the high-pressure turbine, comprising: means for detecting a rotational speed of the low-pressure turbine (N1); means for detecting an ambient temperature of the engine (T1); means for detecting an outlet temperature of the low-pressure turbine (EGT); means for detecting a rotational speed of the high-pressure turbine (N2); means for detecting an atmospheric pressure (P0); means for calculating a low-pressure turbine outlet temperature change (dEGT) based on at least the detected low-pressure turbine rotational speed (N1) and the ambient temperature (T1); means for calculating a model outlet temperature (MODEL-EGTC) based on at least a corrected high-pressure turbine rotational speed (N2C) obtained by correcting the detected high-pressure turbine rotational speed (N2) by the detected ambient temperature (T1) and the detected atmospheric pressure (P0), and for calculating a model outlet temperature difference (dEGTC) by subtracting the calculated model outlet temperature (MODEL-EGTC) from a corrected low-pressure turbine outlet temperature (EGTC) obtained by correcting the detected low-pressure turbine outlet temperature (EGT) by the detected ambient temperature (T1); means for calculating a correction amount (dEGTad) relative to the calculated model outlet temperature difference (dEGTC) based on the calculated model outlet temperature difference (dEGTC) and the detected low-pressure turbine rotational speed (N1); and means for calculating an estimation value of the low-pressure turbine inlet temperature (ITT) based on at least the detected low-pressure turbine outlet temperature (EGT), the calculated outlet temperature change (dEGT) and the correction amount (dEGTad) relative to the calculated model outlet temperature difference (dEGTC).

In order to achieve the object, this invention provides in its third aspect a method for estimating temperature for an aeroplane gas turbine engine mounted on an aircraft and having a combustion chamber, a high-pressure turbine rotated by high-pressure gas exhausted from the combustion chamber, and a low-pressure turbine located downstream of the high-pressure turbine to be rotated by low-pressure gas which has passed through the high-pressure turbine, comprising the steps of: detecting a rotational speed of the low-pressure turbine (N1); detecting an ambient temperature of the engine (T1); detecting an outlet temperature of the low-pressure turbine (EGT); detecting a rotational speed of the high-pressure turbine (N2); detecting an atmospheric pressure (P0); calculating a low-pressure turbine outlet temperature change (dEGT) based on at least the detected low-pressure turbine rotational speed (N1) and the ambient temperature (T1); calculating a model outlet temperature (MODEL-EGTC) based on at least a corrected high-pressure turbine rotational speed (N2C) obtained by correcting the detected high-pressure turbine rotational speed (N2) by the detected ambient temperature (T1) and the detected atmospheric pressure (P0), and calculating a model outlet temperature difference (dEGTC) by subtracting the calculated model outlet temperature (MODEL-EGTC) from a corrected low-pressure turbine outlet temperature (EGTC) obtained by correcting the detected low-pressure turbine outlet temperature (EGT) by the detected ambient temperature (T1); calculating a correction amount (dEGTad) relative to the calculated model outlet temperature difference (dEGTC) based on the calculated model outlet temperature difference (dEGTC) and the detected low-pressure turbine rotational speed (N1); and calculating an estimation value of the low-pressure turbine inlet temperature (ITT) based on at least the detected low-pressure turbine outlet temperature (EGT), the calculated outlet temperature change (dEGT) and the correction amount (dEGTad) relative to the calculated model outlet temperature difference (dEGTC).

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A temperature estimation apparatus for an aeroplane gas turbine engine according to a preferred embodiment of the present invention will now be explained with reference to the attached drawings.

Figure 1:
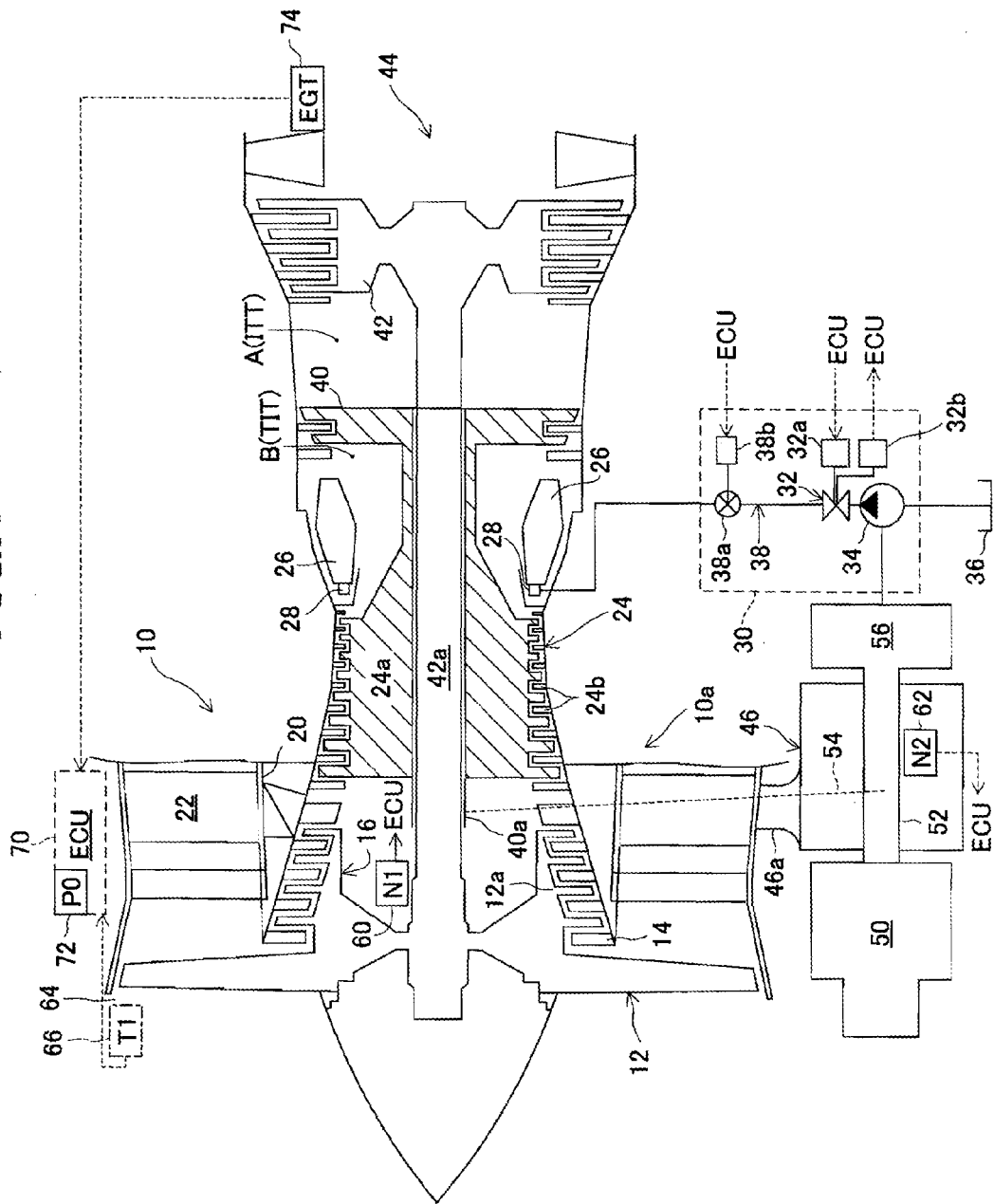
FIG. 1 is an overall schematic view of a temperature estimation apparatus for an aeroplane gas turbine engine according to an embodiment of this invention.

FIG. 1 is an overall schematic view of a temperature estimation apparatus for an aeroplane gas turbine engine according to an embodiment of this invention.

Four types of gas turbine engines, i.e., aeroplane gas turbine engines are commonly known: the turbojet engine, turbofan engine, turboprop engine and turboshaft engine. A two-shaft turbofan engine will be taken as an example in the following explanation.

In FIG. 1, reference numeral 10 designates a turbofan engine (gas turbine engine; hereinafter referred to as "engine"). Reference numeral 10a designates a main engine unit. The engine 10 is mounted at an appropriate location of an aircraft (airframe; not shown).

The engine 10 is equipped with a fan (fan blades) 12 that sucks in air while rotating rapidly. A rotor 12a is formed integrally with the fan 12. The rotor 12a and a stator 14 facing it together make up a low-pressure compressor 16 that compresses the sucked-in air and pumps it rearward.

By a separator or splitter 20, a duct or bypass 22 is formed in the vicinity of the fan 12. Most of the air pulled in passes through the duct 22 to be jetted rearward of the engine 10 without being burned at a later stage (in the core). The force of the air accelerated rearward by the fan 12 produces a force of reaction that acts on the airframe (not shown), at which the engine 10 is mounted, as a propulsive force (thrust). Most of the propulsion is produced by the air flow from the fan.

The air compressed by the low-pressure compressor 16 flows rearward to a high-pressure compressor 24 where it is further compressed by its rotor 24a and stator 24b and then flows rearward to a combustion chamber 26.

The combustion chamber 26 is equipped with a fuel nozzle 28 that is supplied with pressurized fuel metered by an FCU (fuel control unit) 30. The FCU 30 is equipped with a fuel metering valve (FMV) 32. Fuel pumped by a fuel pump (gear pump) 34 from a fuel tank 36 located at an appropriate part of the airframe is metered or regulated by the fuel metering valve 32 and supplied to the fuel nozzle 28 through a fuel supply line 38.

The fuel metering valve 32 is connected to a torque motor 32a to be opened/closed thereby. Based on a command sent from an electronic control unit (ECU; explained later), the torque motor 32a operates the fuel metering valve 32 to open and close. The ECU outputs a command in response to a position of a thrust lever (not shown) manipulated by the pilot (operator). A valve opening sensor 32b is installed near the fuel metering valve 32 to detect the opening thereof.

A fuel shutoff valve (SOV) 38a is interposed in the fuel supply line 38. The fuel shutoff valve 38a is connected to an electromagnetic solenoid 38b to be opened/closed thereby. Based on a command sent from the ECU, the solenoid 38b operates the fuel shutoff valve 38a to open and close. Specifically, when a shutoff command is received, the fuel shutoff valve 38a is closed to shut off the fuel supply to the fuel nozzle 28.

The fuel nozzle 28 is supplied with compressed air from the high-pressure compressor 24 and sprays fuel supplied through the fuel supply line 38 using the compressed air.

The sprayed fuel from the fuel nozzle 28 is mixed with compressed air and the air-fuel mixture is burned after being ignited at engine starting by an ignition unit (not shown) having an exciter and a spark plug. Once the air-fuel mixture begins to burn, the air-fuel mixture composed of compressed air and fuel is continuously supplied and burned.

The hot high-pressure gas produced by the combustion is sent to a high-pressure turbine 40 to rotate it at high speed. The high-pressure turbine 40 is connected to the rotor 24a of the high-pressure compressor 24 through a high-pressure turbine shaft 40a to rotate the rotor 24a.

After driving the high-pressure turbine 40, the hot high-pressure gas is sent to a low-pressure turbine 42 (after passing through the high-pressure turbine 40, the gas becomes lower in pressure than gas sprayed from the combustion chamber 26) to rotate it at relatively low speed. The low-pressure turbine 42 is connected to the rotor 12a of the low-pressure compressor 16 through a low-pressure turbine shaft 42a. The rotor 12a and fan 12 are therefore also rotated. The high-pressure turbine shaft 40a and the low-pressure turbine shaft 42a are provided in a dual concentric structure.

The turbine exhaust gas passing through the low-pressure turbine 42 is mixed with the fan exhaust air passing through the duct 22 without compression or combustion and the combined flow is jetted rearward of the engine 10 through a jet nozzle 44.

An accessory drive gearbox (hereinafter referred to as "gearbox") 46 is attached to the undersurface at the front end of the main engine unit 10a through a stay 46a. An integrated starter/generator (hereinafter called "starter") 50 is attached to the front of the gearbox 46. The FCU 30 is located at the rear of the gearbox 46.

At the time of starting the engine 10, when the shaft 52 is rotated by the starter 50, the rotation thereof is transmitted through a drive shaft 54 (and a gear mechanism including a bevel gear etc. (not shown)) to the high-pressure turbine shaft 40a to generate compressed air. The compressed air is supplied to the fuel nozzle 28, as mentioned above.

The rotation of the shaft 52 is also transmitted to a PMA (permanent magnet alternator) 56 and the (high-pressure) fuel pump 34. The fuel pump 34 is therefore driven to pump and spray metered fuel from the fuel nozzle 28 as explained above. The resulting air-fuel mixture is ignited to start combustion.

When the engine 10 reaches a self-sustaining operating speed, the rotation of the high-pressure turbine shaft 40a is transmitted back to the shaft 52 through the drive shaft 54 (and the gear mechanism including the bevel gear etc. (not shown)) to drive the fuel pump 34 and also drive the PMA 56 and starter 50. The PMA 56 therefore generates electricity and the starter 50 also generates electricity to be supplied to the airframe. When electrical load on the airframe side is increased, power generated by the starter 50 is increased and rotational load of the high-pressure turbine shaft 40a is increased, thereby affecting the high-pressure turbine rotational speed, which will be explained later.

An N1 sensor (rotational speed sensor) 60 is installed near the low-pressure turbine shaft 42a of the engine 10 and generates an output or signal proportional to the rotational speed of the low-pressure turbine 42 (rotational speed of the low-pressure turbine shaft 42a) N1.

An N2 sensor (rotational speed sensor) 62 is installed near the shaft 52 and generates an output or signal proportional to the rotational speed of the high-pressure turbine 40 (rotational speed of the high-pressure turbine shaft 40a) N2.

Near an air intake 64 at the front of the main engine unit 10a, a T1 sensor (temperature sensor) 66 is installed and generate outputs or signals proportional to the temperature (ambient temperature of the engine 10 and aircraft) T1 of the inflowing air at that location.

The aforesaid ECU (now assigned with reference numeral 70) is installed at an upper location of the main engine unit 10a. The ECU 70 includes a microcomputer comprising a CPU, a ROM, a RAM and I/Os (all not shown), and is housed in a case installed at the upper location in the main engine unit 10a. Similarly, the FCU 30 includes a microcomputer comprising a CPU, a ROM, a RAM and I/Os (all not shown), and is housed in a case.

A P0 sensor (pressure sensor) 72 is installed in the case of the ECU and generates an output or signal proportional to atmospheric pressure P0.

An EGT sensor (temperature sensor) 74 is installed at an appropriate location downstream of the low-pressure turbine 42 and generates an output or signal proportional to the outlet temperature of the low-pressure turbine 42 (exhaust gas temperature EGT).

The outputs of the foregoing sensors indicating the operating condition of the engine 10 are sent to the ECU 70. The ECU 70 operates and functions as the temperature estimation apparatus that estimates an inlet (and intermediate) temperature of the low-pressure turbine 42 (ITT; Intermediate Turbine Temperature; the temperature at a location designated by "A" in FIG. 1) based on an outlet temperature of the low-pressure turbine 42 (EGT; Exhaust Gas Temperature) and the like as will be explained later. A temperature at a location designated by "B" in FIG. 1 is an inlet temperature of the high-pressure turbine 40 (TIT; Turbine Inlet Temperature).

The operation of the ECU 70 to estimate the inlet temperature of the low-pressure turbine 42 conducted by the ECU 70 will be explained.

Figure 2:
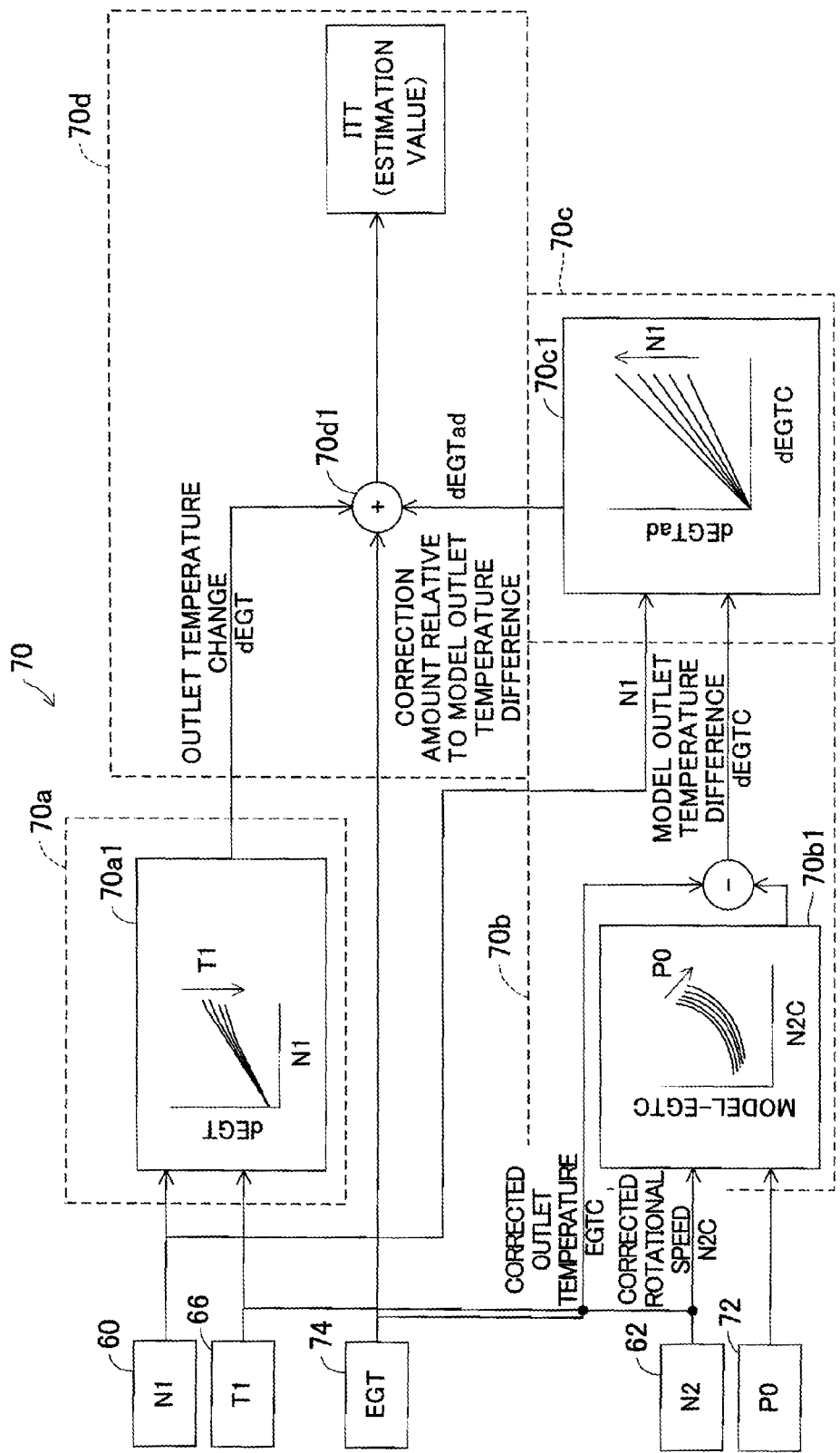
FIG. 2 is a block diagram for functionally explaining the operation of the temperature estimation apparatus, specifically the operation of an electronic control unit (ECU) of the apparatus shown in FIG. 1.

FIG. 2 is a block diagram for functionally explaining the operation of the ECU 70.

As illustrated, the ECU 70 has an outlet temperature change calculator 70a that calculates a low-pressure turbine outlet temperature change (change of the temperature at the outlet of the low-pressure turbine 42) dEGT based on at least the detected low-pressure turbine rotational speed N1 and ambient temperature T1, a model outlet temperature difference calculator 70b that calculates a model outlet temperature MODEL-EGTC based on at least a corrected high-pressure turbine rotational speed N2C (obtained by correcting the detected high-pressure turbine rotational speed N2 by the detected ambient temperature T1) and the detected atmospheric pressure P0, and calculates a model outlet temperature difference dEGTC by subtracting the calculated model outlet temperature MODEL-EGTC from a corrected low-pressure turbine outlet temperature EGTC (obtained by correcting the detected low-pressure turbine outlet temperature EGT by the detected ambient temperature T1), a model outlet temperature difference correction amount calculator 70c that calculates a correction amount dEGTad relative to the calculated model outlet temperature difference dEGTC based on the calculated model outlet temperature difference dEGTC and the detected low-pressure turbine rotational speed N1, and an inlet temperature estimation value calculator 70d that calculates an estimation value of the low-pressure turbine inlet temperature (temperature at the inlet of the low-pressure turbine 42) ITT based on at least the detected low-pressure turbine outlet temperature EGT, the calculated outlet temperature change dEGT and correction amount dEGTad (relative to the calculated model outlet temperature difference dEGTC).

As shown in the figure, the outlet temperature change calculator 70a calculates the low-pressure turbine outlet temperature change dEGT by retrieving first characteristics 70a1 preset beforehand by the detected low-pressure turbine rotational speed N1 and ambient temperature T1.

The first characteristics 70a1 are preset such that the low-pressure turbine outlet temperature change dEGT increases with increasing low-pressure turbine rotational speed N1 and decreases with increasing ambient temperature T1. The first characteristics 70a1 are stored in the ROM of the microcomputer of the ECU 70 as mapped data retrievable by the parameters.

The model outlet temperature difference calculator 70b calculates the model outlet temperature MODEL-EGTC by retrieving second characteristics 70b1 preset beforehand by the corrected high-pressure turbine rotational speed N2C (obtained by correcting the detected high-pressure turbine rotational speed N2 by the detected ambient temperature T1) and the detected atmospheric pressure P0, and calculates the model outlet temperature difference dEGTC by subtracting the calculated model outlet temperature MODEL-EGTC from the corrected low-pressure turbine outlet temperature EGTC (obtained by correcting the detected low-pressure turbine outlet temperature EGT by the detected ambient temperature T1). The model outlet temperature difference dEGTC means a difference between the model outlet temperature MODEL-EGTC and outlet temperature EGTC.

Here, the corrected high-pressure turbine rotational speed N2C and corrected outlet temperature EGTC mean the high-pressure turbine rotational speed N2 and low-pressure turbine outlet temperature EGT each corrected by the detected ambient temperature T1. The model outlet temperature MODEL-EGTC means a standard or normal corrected outlet temperature retrieved by the aforesaid parameters.

As illustrated, the second characteristics 70b1 are preset such that the model outlet temperature MODEL-EGTC increases with increasing corrected high-pressure turbine rotational speed N2C (obtained by correcting the detected high-pressure turbine rotational speed N2 by the detected ambient temperature T1), and decreases with increasing atmospheric pressure P0.

The model outlet temperature difference correction amount calculator 70c calculates the correction amount dEGTad relative to the calculated model outlet temperature difference dEGTC by retrieving third characteristics 70c1 preset beforehand by the calculated model outlet temperature difference dEGTC and the detected low-pressure turbine rotational speed N1.

The third characteristics 70c1 are preset such that the correction amount dEGTad increases with increasing model outlet temperature difference dEGTC and increasing low-pressure turbine rotational speed N1. The second and third characteristics 70b1, 70c1 are stored in the ROM of the microcomputer of the ECU 70 as mapped data retrievable by the parameters.

The inlet temperature estimation value calculator 70d has an adder 70d1 and calculates the estimation value of the low-pressure turbine inlet temperature ITT by adding the detected low-pressure turbine outlet temperature EGT, the calculated outlet temperature change dEGT and correction amount dEGTad (relative to the calculated model outlet temperature difference dEGTC) at the adder 70d1.

As stated above, this embodiment is configured to have an apparatus and method for estimating temperature for an aeroplane gas turbine engine (10) mounted on an aircraft and having a combustion chamber (26), a high-pressure turbine (40) rotated by high-pressure gas exhausted from the combustion chamber, and a low-pressure turbine (42) located downstream of the high-pressure turbine to be rotated by low-pressure gas which has passed through the high-pressure turbine, comprising: a low-pressure turbine rotational speed sensor (N1 sensor 60) adapted to detect (or means for or step of detecting) a rotational speed of the low-pressure turbine (N1); an ambient temperature sensor (T1 sensor 66) adapted to detect (or means for or step of detecting) an ambient temperature of the engine (T1); an outlet temperature sensor (EGT sensor 74) adapted to detect (or means for or step of detecting) an outlet temperature of the low-pressure turbine (EGT); a high-pressure turbine rotational speed sensor (N2 sensor 62) adapted to detect (or means for or step of detecting) a rotational speed of the high-pressure turbine (N2); an atmospheric pressure sensor (P0 sensor 72) adapted to detect (or means for or step of detecting) an atmospheric pressure (P0); an outlet temperature change calculator (ECU 70, 70a) that calculates (or means for or step of calculating) a low-pressure turbine outlet temperature change (dEGT) based on at least the detected low-pressure turbine rotational speed (N1) and the ambient temperature (T1); a model outlet temperature difference calculator (ECU 70, 70b) that calculates (or means for or step of calculating) a model outlet temperature (MODEL-EGTC) based on at least a corrected high-pressure turbine rotational speed (N2C) obtained by correcting the detected high-pressure turbine rotational speed (N2) by the detected ambient temperature (T1) and the detected atmospheric pressure (P0), and calculates a model outlet temperature difference (dEGTC) by subtracting the calculated model outlet temperature (MODEL-EGTC) from a corrected low-pressure turbine outlet temperature (EGTC) obtained by correcting the detected low-pressure turbine outlet temperature (EGT) by the detected ambient temperature (T1); a model outlet temperature difference correction amount calculator (ECU 70, 70c) that calculates (or means for or step of calculating) a correction amount (dEGTad) relative to the calculated model outlet temperature difference (dEGTC) based on the calculated model outlet temperature difference (dEGTC) and the detected low-pressure turbine rotational speed (N1); and an inlet temperature estimation value calculator (ECU 70, 70d) that calculates (or means for or step of calculating) an estimation value of the low-pressure turbine inlet temperature (ITT) based on at least the detected low-pressure turbine outlet temperature (EGT), the calculated outlet temperature change (dEGT) and the correction amount (dEGTad) relative to the calculated model outlet temperature difference (dEGTC).

With this, it becomes possible to estimate the inlet temperature of the low-pressure turbine 42, without measurement, thereby enable to make the engine 10 smaller and more compact. In addition, since the estimation value of the inlet temperature of the low-pressure turbine 42 is calculated from the outlet temperature (EGT) and its change of the low-pressure turbine 42, it becomes possible to estimate the temperature accurately.

In the apparatus, the outlet temperature change calculator calculates the low-pressure turbine outlet temperature change (dEGT) by retrieving first characteristics (70a1) preset beforehand by the detected low-pressure turbine rotational speed (N1) and the ambient temperature (T1), and the first characteristics are preset such that the low-pressure turbine outlet temperature change (dEGT) increases with increasing low-pressure turbine rotational speed (N1) and decreases with increasing ambient temperature (T1).

With this, it becomes possible to estimate the inlet temperature of the low-pressure turbine 42 more accurately. In addition since the temperature is estimated using the first characteristics 70a1 preset beforehand, it becomes possible to make the structure simple.

In the apparatus, the model outlet temperature difference calculator calculates the model outlet temperature (MODEL-EGTC) by retrieving second characteristics (70b1) preset beforehand by the corrected high-pressure turbine rotational speed (N2C) obtained by correcting the detected high-pressure turbine rotational speed (N2) by the detected ambient temperature (T1) and the detected atmospheric pressure (P0), and calculates the model outlet temperature difference (dEGTC) by subtracting the calculated model outlet temperature (MODEL-EGTC) from the corrected low-pressure turbine outlet temperature (EGTC) obtained by correcting the detected low-pressure turbine outlet temperature (EGT) by the detected ambient temperature (T1), and the second characteristics are preset such that the model outlet temperature (MODEL-EGTC) increases with increasing corrected high-pressure turbine rotational speed (N2C) obtained by correcting the detected high-pressure turbine rotational speed (N2) by the detected ambient temperature (T1), and decreases with increasing atmospheric pressure (P0).

With this, it becomes possible to estimate the inlet temperature of the low-pressure turbine 42 more accurately. In addition since the temperature is estimated using the second characteristics 70b1 preset beforehand, it becomes possible to make the structure simple.

In the apparatus, the model outlet temperature difference correction amount calculator calculates the correction amount (dEGTad) relative to the calculated model outlet temperature difference (dEGTC) by retrieving third characteristics (70c1) preset beforehand by the calculated model outlet temperature difference (dEGTC) and the detected low-pressure turbine rotational speed (N1), and the third characteristics are preset such that the correction amount (dEGTad) increases with increasing model outlet temperature difference (dEGTC) and increasing low-pressure turbine rotational speed (N1).

With this, it becomes possible to estimate the inlet temperature of the low-pressure turbine 42 more accurately. In addition since the temperature is estimated using the third characteristics 70c1 preset beforehand, it becomes possible to make the structure simple.

In the apparatus, the inlet temperature estimation value calculator has an adder and calculates the estimation value of the low-pressure turbine inlet temperature (ITT) by adding the detected low-pressure turbine outlet temperature (EGT), the calculated outlet temperature change (dEGT) and the correction amount (dEGTad) relative to the calculated model outlet temperature difference (dEGTC) at the adder.

With this, it becomes possible to make the structure simple.

It should be noted that the parameters used in the estimation are not restrictive and any other parameter can be added thereto. For that reason, the phrase "at least" is used in the claims as mentioned below.

Japanese Patent Application No. 2010-208314 filed on Sep. 16, 2010, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for estimating temperature for an aeroplane gas turbine engine mounted on an aircraft and having a combustion chamber, a high-pressure turbine rotated by high-pressure gas exhausted from the combustion chamber, and a low-pressure turbine located downstream of the high-pressure turbine to be rotated by low-pressure gas which has passed through the high-pressure turbine, comprising:
a low-pressure turbine rotational speed sensor adapted to detect a rotational speed of the low-pressure turbine (N1);
an ambient temperature sensor adapted to detect an ambient temperature of the engine (T1);
an outlet temperature sensor adapted to detect an outlet temperature of the low-pressure turbine (EGT);
a high-pressure turbine rotational speed sensor adapted to detect a rotational speed of the high-pressure turbine (N2);
an atmospheric pressure sensor adapted to detect an atmospheric pressure (P0);
an outlet temperature change calculator that calculates a low-pressure turbine outlet temperature change (dEGT) based on at least the detected low-pressure turbine rotational speed (N1) and the ambient temperature (T1);
a model outlet temperature difference calculator that calculates a model outlet temperature (MODEL-EGTC) based on at least a corrected high-pressure turbine rotational speed (N2C) obtained by correcting the detected high-pressure turbine rotational speed (N2) by the detected ambient temperature (T1) and the detected atmospheric pressure (P0), and calculates a model outlet temperature difference (dEGTC) by subtracting the calculated model outlet temperature (MODEL-EGTC) from a corrected low-pressure turbine outlet temperature (EGTC) obtained by correcting the detected low-pressure turbine outlet temperature (EGT) by the detected ambient temperature (T1);
a model outlet temperature difference correction amount calculator that calculates a correction amount (dEGTad) relative to the calculated model outlet temperature difference (dEGTC) based on the calculated model outlet temperature difference (dEGTC) and the detected low-pressure turbine rotational speed (N1); and
an inlet temperature estimation value calculator that calculates an estimation value of the low-pressure turbine inlet temperature (ITT) based on at least the detected low-pressure turbine outlet temperature (EGT), the calculated outlet temperature change (dEGT) and the correction amount (dEGTad) relative to the calculated model outlet temperature difference (dEGTC),
wherein the model outlet temperature difference calculator calculates the model outlet temperature (MODEL-EGTC) by retrieving second characteristics preset beforehand by the corrected high-pressure turbine rotational speed (N2C) obtained by correcting the detected high-pressure turbine rotational speed (N2) by the detected ambient temperature (T1) and the detected atmospheric pressure (P0), and calculates the model outlet temperature difference (dEGTC) by subtracting the calculated model outlet temperature (MODEL-EGTC) from the corrected low-pressure turbine outlet temperature (EGTC) obtained by correcting the detected low-pressure turbine outlet temperature (EGT) by the detected ambient temperature T1.

2. The apparatus according to claim 1, wherein the outlet temperature change calculator calculates the low-pressure turbine outlet temperature change (dEGT) by retrieving first characteristics preset beforehand by the detected low-pressure turbine rotational speed (N1) and the ambient temperature (T1).

3. The apparatus according to claim 2, wherein the first characteristics are preset such that the low-pressure turbine outlet temperature change (dEGT) increases with increasing low-pressure turbine rotational speed (N1) and decreases with increasing ambient temperature (T1).

4. The apparatus according to claim 1, wherein the second characteristics are preset such that the model outlet temperature (MODEL-EGTC) increases with increasing corrected high-pressure turbine rotational speed (N2C) obtained by correcting the detected high-pressure turbine rotational speed (N2) by the detected ambient temperature (T1), and decreases with increasing atmospheric pressure (P0).

5. The apparatus according to claim 1, wherein the model outlet temperature difference correction amount calculator calculates the correction amount (dEGTad) relative to the calculated model outlet temperature difference (dEGTC) by retrieving third characteristics preset beforehand by the calculated model outlet temperature difference (dEGTC) and the detected low-pressure turbine rotational speed (N1).

6. The apparatus according to claim 5, wherein the third characteristics are preset such that the correction amount (dEGTad) increases with increasing model outlet temperature difference (dEGTC) and increasing low-pressure turbine rotational speed (N1).

7. The apparatus according to claim 1, wherein the inlet temperature estimation value calculator has an adder and calculates the estimation value of the low-pressure turbine inlet temperature (ITT) by adding the detected low-pressure turbine outlet temperature (EGT), the calculated outlet temperature change (dEGT) and the correction amount (dEGTad) relative to the calculated model outlet temperature difference (dEGTC) at the adder.

8. An apparatus for estimating temperature for an aeroplane gas turbine engine mounted on an aircraft and having a combustion chamber, a high-pressure turbine rotated by high-pressure gas exhausted from the combustion chamber, and a low-pressure turbine located downstream of the high-pressure turbine to be rotated by low-pressure gas which has passed through the high-pressure turbine, comprising:

means for detecting a rotational speed of the low-pressure turbine (N1);
means for detecting an ambient temperature of the engine (T1);
means for detecting an outlet temperature of the low-pressure turbine (EGT);
means for detecting a rotational speed of the high-pressure turbine (N2);
means for detecting an atmospheric pressure (P0);
means for calculating a low-pressure turbine outlet temperature change (dEGT) based on at least the detected low-pressure turbine rotational speed (N1) and the ambient temperature (T1);
means for calculating a model outlet temperature (MODEL-EGTC) based on at least a corrected high-pressure turbine rotational speed (N2C) obtained by correcting the detected high-pressure turbine rotational speed (N2) by the detected ambient temperature (T1) and the detected atmospheric pressure (P0), and for calculating a model outlet temperature difference (dEGTC) by subtracting the calculated model outlet temperature (MODEL-EGTC) from a corrected low-pressure turbine outlet temperature (EGTC) obtained by correcting the detected low-pressure turbine outlet temperature (EGT) by the detected ambient temperature (T1);
means for calculating a correction amount (dEGTad) relative to the calculated model outlet temperature difference (dEGTC) based on the calculated model outlet temperature difference (dEGTC) and the detected low-pressure turbine rotational speed (N1); and
means for calculating an estimation value of the low-pressure turbine inlet temperature (ITT) based on at least the detected low-pressure turbine outlet temperature (EGT), the calculated outlet temperature change (dEGT) and the correction amount (dEGTad) relative to the calculated model outlet temperature difference (dEGTC),
wherein the inlet temperature estimation value calculating means has an adder and calculates the estimation value of the low-pressure turbine inlet temperature (ITT) by adding the detected low-pressure turbine outlet temperature (EGT), the calculated outlet temperature change (dEGT) and the correction amount (dEGTad) relative to the calculated model outlet temperature difference (dEGTC) at the adder.

9. The apparatus according to claim 8, wherein the outlet temperature change calculating means calculates the low-pressure turbine outlet temperature change (dEGT) by retrieving first characteristics preset beforehand by the detected low-pressure turbine rotational speed (N1) and the ambient temperature (T1).

10. The apparatus according to claim 9, wherein the first characteristics are preset such that the low-pressure turbine outlet temperature change (dEGT) increases with increasing low-pressure turbine rotational speed (N1) and decreases with increasing ambient temperature (T1).

11. The apparatus according to claim 8, wherein the model outlet temperature difference calculating means calculates the model outlet temperature (MODEL-EGTC) by retrieving second characteristics preset beforehand by the corrected high-pressure turbine rotational speed (N2C) obtained by correcting the detected high-pressure turbine rotational speed (N2) by the detected ambient temperature (T1) and the detected atmospheric pressure (P0), and calculates the model outlet temperature difference (dEGTC) by subtracting the calculated model outlet temperature (MODEL-EGTC) from the corrected low-pressure turbine outlet temperature (EGTC) obtained by correcting the detected low-pressure turbine outlet temperature (EGT) by the detected ambient temperature T1.

12. The apparatus according to claim 11, wherein the second characteristics are preset such that the model outlet temperature (MODEL-EGTC) increases with increasing corrected high-pressure turbine rotational speed (N2C) obtained by correcting the detected high-pressure turbine rotational speed (N2) by the detected ambient temperature (T1), and decreases with increasing atmospheric pressure (P0).

13. The apparatus according to claim 8, wherein the model outlet temperature difference correction amount calculating means calculates the correction amount (dEGTad) relative to the calculated model outlet temperature difference (dEGTC) by retrieving third characteristics preset beforehand by the calculated model outlet temperature difference (dEGTC) and the detected low-pressure turbine rotational speed (N1).

14. The apparatus according to claim 13, wherein the third characteristics are preset such that the correction amount (dEGTad) increases with increasing model outlet temperature difference (dEGTC) and increasing low-pressure turbine rotational speed (N1).

15. A method for estimating temperature for an aeroplane gas turbine engine mounted on an aircraft and having a combustion chamber, a high-pressure turbine rotated by high-pressure gas exhausted from the combustion chamber, and a low-pressure turbine located downstream of the high-pressure turbine to be rotated by low-pressure gas which has passed through the high-pressure turbine, comprising the steps of:

detecting a rotational speed of the low-pressure turbine (N1) using a low-pressure turbine rotational speed sensor;
detecting an ambient temperature of the engine (T1) using an ambient temperature sensor;
detecting an outlet temperature of the low-pressure turbine (EGT) using an outlet temperature sensor;
detecting a rotational speed of the high-pressure turbine (N2) using a high-pressure turbine rotational speed sensor;
detecting an atmospheric pressure (P0) using an atmospheric pressure sensor;
calculating, using an outlet temperature change calculator, a low-pressure turbine outlet temperature change (dEGT) based on at least the detected low-pressure turbine rotational speed (N1) and the ambient temperature (T1);
calculating, using a model outlet temperature difference calculator, a model outlet temperature (MODEL-EGTC) based on at least a corrected high-pressure turbine rotational speed (N2C) obtained by correcting the detected high-pressure turbine rotational speed (N2) by the detected ambient temperature (T1) and the detected atmospheric pressure (P0), and calculating a model outlet temperature difference (dEGTC) by subtracting the calculated model outlet temperature (MODEL-EGTC)

from a corrected low-pressure turbine outlet temperature (EGTC) obtained by correcting the detected low-pressure turbine outlet temperature (EGT) by the detected ambient temperature (T1);

calculating, using a model outlet temperature difference correction amount calculator, a correction amount (dEGTad) relative to the calculated model outlet temperature difference (dEGTC) based on the calculated model outlet temperature difference (dEGTC) and the detected low-pressure turbine rotational speed (N1); and calculating, using an inlet temperature estimation value calculator, an estimation value of the low-pressure turbine inlet temperature (ITT) based on at least the detected low-pressure turbine outlet temperature (EGT), the calculated outlet temperature change (dEGT) and the correction amount (dEGTad) relative to the calculated model outlet temperature difference (dEGTC), wherein the step of model outlet temperature difference calculating calculates the model outlet temperature (MODEL-EGTC) by retrieving second characteristics preset beforehand by the corrected high-pressure turbine rotational speed (N2C) obtained by correcting the detected high-pressure turbine rotational speed (N2) by the detected ambient temperature (T1) and the detected atmospheric pressure (P0), and calculates the model outlet temperature difference (dEGTC) by subtracting the calculated model outlet temperature (MODEL-EGTC) from the corrected low-pressure turbine outlet temperature (EGTC) obtained by correcting the detected low-pressure turbine outlet temperature (EGT) by the detected ambient temperature T1.

16. The method according to claim 15, wherein the step of outlet temperature change calculating calculates the low-pressure turbine outlet temperature change (dEGT) by retrieving first characteristics preset beforehand by the detected low-pressure turbine rotational speed (N1) and the ambient temperature (T1).

17. The method according to claim 16, wherein the first characteristics are preset such that the low-pressure turbine outlet temperature change (dEGT) increases with increasing low-pressure turbine rotational speed (N1) and decreases with increasing ambient temperature (T1).

18. The method according to claim 15, wherein the second characteristics are preset such that the model outlet temperature (MODEL-EGTC) increases with increasing corrected high-pressure turbine rotational speed (N2C) obtained by correcting the detected high-pressure turbine rotational speed (N2) by the detected ambient temperature (T1), and decreases with increasing atmospheric pressure (P0).

19. The method according to claim 15, wherein the step of model outlet temperature difference correction amount calculating calculates the correction amount (dEGTad) relative to the calculated model outlet temperature difference (dEGTC) by retrieving third characteristics preset beforehand by the calculated model outlet temperature difference (dEGTC) and the detected low-pressure turbine rotational speed (N1).

20. The method according to claim 19, wherein the third characteristics are preset such that the correction amount (dEGTad) increases with increasing model outlet temperature difference (dEGTC) and increasing low-pressure turbine rotational speed (N1).

21. The method according to claim 15, wherein the step of inlet temperature estimation value calculating calculates the estimation value of the low-pressure turbine inlet temperature (ITT) by adding the detected low-pressure turbine outlet temperature (EGT), the calculated outlet temperature change (dEGT) and the correction amount (dEGTad) relative to the calculated model outlet temperature difference (dEGTC) at an adder.

* * * * *